United States Patent
Oertel et al.

(10) Patent No.: US 10,748,401 B2
(45) Date of Patent: Aug. 18, 2020

(54) GAS DETECTION DEVICE

(71) Applicant: Dräger Safety AG & Co. KGaA, Lübeck (DE)

(72) Inventors: Marcus Oertel, Stockelsdorf (DE); Wilfried Diekmann, Utecht (DE)

(73) Assignee: Dräger Safety AG & Co. KGaA, Lübeck (DE)

( * ) Notice: Subject to any disclaimer, the term of this patent is extended or adjusted under 35 U.S.C. 154(b) by 0 days.

(21) Appl. No.: 16/207,734

(22) Filed: Dec. 3, 2018

(65) Prior Publication Data

US 2019/0114893 A1    Apr. 18, 2019

Related U.S. Application Data

(63) Continuation of application No. 15/116,337, filed as application No. PCT/EP2015/000194 on Feb. 2, 2015, now abandoned.

(30) Foreign Application Priority Data

Feb. 8, 2014 (DE) .......................... 10 2014 001 704

(51) Int. Cl.
| | | |
|---|---|---|
| *G08B 17/12* | (2006.01) | |
| *G08B 17/103* | (2006.01) | |
| *G08B 21/14* | (2006.01) | |
| *G08B 21/16* | (2006.01) | |
| *G06T 7/00* | (2017.01) | |
| *H04N 5/33* | (2006.01) | |
| *H04N 7/18* | (2006.01) | |
| *H04N 5/225* | (2006.01) | |

(52) U.S. Cl.
CPC ............ *G08B 17/125* (2013.01); *G06T 7/001* (2013.01); *G08B 17/103* (2013.01); *G08B 21/14* (2013.01); *G08B 21/16* (2013.01); *H04N 5/2252* (2013.01); *H04N 5/332* (2013.01); *H04N 7/183* (2013.01); *G06T 2207/10048* (2013.01)

(58) Field of Classification Search
None
See application file for complete search history.

(56) References Cited

U.S. PATENT DOCUMENTS

| | | | | |
|---|---|---|---|---|
| 5,382,943 A * | 1/1995 | Tanaka | ............. | G08B 13/19619 340/500 |
| 6,384,414 B1 * | 5/2002 | Fisher | ........................ | G01J 5/08 250/339.05 |
| 6,476,859 B1 * | 11/2002 | Galloway | ............. | G01S 3/7864 348/143 |
| 6,515,285 B1 * | 2/2003 | Marshall | ................... | G01J 5/20 250/339.03 |

(Continued)

FOREIGN PATENT DOCUMENTS

EP          1300816 A1 *  4/2003  .......... G08B 17/125

*Primary Examiner* — Reza Aghevli
(74) *Attorney, Agent, or Firm* — McGlew and Tuttle, P.C.

(57) ABSTRACT

A gas detection device has at least one functional device (1, 13), which is configured to receive radiation (10) passing through a defined monitoring area (4). At least one analysis unit (9, 19) is configured to detect and analyze a change in the received radiation (10). The received radiation (10) is based on the interaction of the radiation (10) with a gas present within the monitoring area (4). At least one camera (8) has a field of view (11) that at least partially detects the monitoring area (4).

18 Claims, 1 Drawing Sheet

(56) References Cited

U.S. PATENT DOCUMENTS

| | | | | |
|---|---|---|---|---|
| 8,834,020 B2* | 9/2014 | Abreu | ............... | H04N 5/2256 |
| | | | | 374/121 |
| 9,025,144 B2* | 5/2015 | Knox | ............... | G01N 15/06 |
| | | | | 356/338 |
| 9,267,884 B2* | 2/2016 | Knox | ............... | G01N 15/0205 |
| 9,448,168 B2* | 9/2016 | Knox | ............... | G01N 15/1434 |
| 9,594,066 B2* | 3/2017 | Knox | ............... | G01S 7/4873 |
| 2010/0093096 A1* | 4/2010 | Acharya | ............... | G01N 21/77 |
| | | | | 436/4 |
| 2011/0266445 A1* | 11/2011 | Beratan | ............... | H01L 37/00 |
| | | | | 250/338.4 |
| 2013/0124039 A1* | 5/2013 | Abreu | ............... | A61B 5/0042 |
| | | | | 701/36 |
| 2014/0002639 A1* | 1/2014 | Cheben | ............... | G08B 21/14 |
| | | | | 348/135 |
| 2015/0241330 A1* | 8/2015 | Knox | ............... | G08B 17/125 |
| | | | | 356/338 |

* cited by examiner

GAS DETECTION DEVICE

CROSS REFERENCE TO RELATED APPLICATIONS

This application is a continuation of, and claims the benefit of priority under 35 U.S.C. § 120 of, U.S. application Ser. No. 15/116,337 filed Aug. 3, 2016, which is a United States National Phase Application of International Application PCT/EP2015/000194 filed Feb. 2, 2015 and claims the benefit of priority under 35 U.S.C. § 119 of German Application 10 2014 001 704.4 filed Feb. 8, 2014 the entire contents of which are incorporated herein by reference.

FIELD OF THE INVENTION

The present invention pertains to a gas detection device.

BACKGROUND OF THE INVENTION

Gas detection devices are used, for example, in plants for delivering and processing combustible and/or toxic gases in order to detect unintentionally discharged gases.

Gas detection devices are known that measure the concentration of such gases locally, i.e., in the immediate surrounding area, and are interlinked with one another in order to make it possible to monitor larger areas.

In addition, there also are gas detection devices with an open measured path, which are called open-path gas detection devices. The measured paths may range from a few meters to a few hundred meters. Open-path gas detection devices analyze electromagnetic or light radiation, which has passed through a defined monitoring area. The electromagnetic or light radiation is analyzed with respect to a possible interaction with an unintentionally discharged gas, which interaction causes changes in the properties of the radiation. This makes possible a continuous monitoring of a relatively large area in respect to an unintentional discharge of gases, and the quantity and the species of the discharged gas or gases can also be inferred by analyzing the changed properties of the radiation. The radiation used for the monitoring may be, for example, thermal radiation of the background, or this originates from a radiation source of the gas detection device itself.

The functional devices used in gas detection devices have, as a rule, a limited field of view, i.e., these must be aligned relatively accurately towards the radiation source or the area to be monitored. This also applies to open-path gas detection devices, which comprise as functional devices, as a rule, at least one transmitter with a radiation source and a receiver with a radiation detector, to which the radiation emitted by the radiation source is focused. The radiation source may be, for example, a thermal radiator, for example, a xenon flash lamp, or a semiconductor radiator, for example, a tunable laser. Such open-path gas detection devices require that both the transmitter and the radiation source integrated therein be aligned in order to direct sufficient radiation output to the entry aperture of the receiver and also that the receiver be aligned in order for the radiation falling on the entry aperture to reach the radiation detector as centrally as possible.

Another type of open-path gas detection devices comprises a reflector, which is positioned at a distance of usually up to 50 m from a combined transmitter/receiver unit and to which the radiation emitted by a radiation source of the transmitter is projected. The reflector reflects the radiation in the direction of the transmitter/receiver unit, as a result of which this can be detected by a radiation detector of the unit.

What is detected in open-path gas detection devices is, in principle, not the concentration of the detected gas but the so-called integral concentration. This is the product of the concentration and the length of the measured path. Localization of a corresponding gas leak, i.e., determination of the concentration and size of the gas cloud, is not possible, because a large cloud with a low concentration may lead to the same measured value as a small cloud with a high concentration. The fault indications of open-path gas detection devices are therefore rarely used alone to trigger follow-up measures, for example, an emergency shut-off or evacuation of the plant being monitored. As rule, at least an additional confirmation of the detection by spot measuring devices, which can measure the absolute concentration, is needed. The measured area causing the fault also often must be entered by emergency crews, e.g., firefighters, in order to establish the cause of the fault indication.

Open measured paths may, moreover, be blocked by obstacles, e.g., vehicles or persons, or blocked by contamination of the functional devices of the gas detection device and the detection of the radiation may thus be interrupted (so-called "beam block"). As a rule, a fault indication is issued only in case of a rather long-term interruption of the measured path, because it can no longer be assumed in this case that only a person or a vehicle is moving through the measured path.

The cause should be able to be established as quickly as possible when a "beam block" or a concentration of a gas to be detected above a limit value is determined.

A fire alarm box for monitoring a room and for triggering a fire alarm is known from DE 10 2010 015 467 B4. This box comprises a smoke sensor and a temperature sensor, and the measurement results of the smoke sensor and the temperature sensor are linked in order to avoid false triggering as much as possible. The fire alarm box may have, in addition, a camera, by which the room can be seen optically for monitoring for break-in. A picture taken by the camera can be transmitted for this via a radio network. Furthermore, it is disclosed that the fire alarm box may have a gas sensor, which is used to detect carbon dioxide formed during a fire.

DE 20 2008 010 173 U1 discloses a mobile monitoring center for indoor and outdoor use. The monitoring center comprises a steel cylinder with an attached mast, which has at least one sensor system and an auxiliary device, the steel cylinder comprising a supply unit with a power supply from the power line or from a battery. Furthermore, a control unit and a device for online communication shall be present. The sensors shall be image-recording devices, a motion sensor and a stereometric sound-recording device. The possible use of a module for gas detection is also disclosed. The auxiliary devices shall comprise a searchlight and devices for optical and acoustic signal generation.

SUMMARY OF THE INVENTION

Based on this state of the art, a basic object of the present invention is to advantageously perfect an open-path gas detection device and especially to improve the possibility of analyzing a fault indication transmitted by this.

A basic idea of the present invention comprises analyzing a fault indication issued by the gas detection device such that it can be improved by an integration of a camera in an (open-path) gas detection device of this class and by a linking of the data generated by these.

Accordingly, a gas detection device with at least one functional device, which is configured at least to receive a radiation having passed through a defined monitoring area, and with at least one analysis unit, which is configured to detect and analyze a change in the radiation received, which is due to an interaction of the radiation with a gas (to be detected) present within the monitoring area, is characterized by at least one camera, i.e., an optical image-recording device, whose field of view detects the monitored range at least partially and preferably completely.

Furthermore, provisions may be made for the gas detection device according to the present invention to have at least one data transmission device, which can be used to transmit data generated by the functional device and the at least one camera to a (remotely positioned) reception site. The reception site may be a monitoring center or an (additional) analysis unit used in a monitoring center, optionally in combination with an output device (e.g., a monitor). The monitoring center may also act centrally as a reception site for a plurality of gas detection devices according to the present invention and also other monitoring devices. The data transmission may be either wired or wireless transmission (e.g., via any desired radio transmission).

The at least one analysis unit may be used to analyze the data, which are generated by the functional device and are based on the received radiation, as well as the data generated by the at least one camera and optionally to derive or initiate follow-up measures from these. The analysis unit or the at least one analysis unit may be integrated in a functional unit comprising the functional device and the at least one camera, as a result of which an analysis of the data can already take place on the spot. This makes it possible, in particular, for the data transmission device to be used for transmitting a fault indication to the reception site only when a fault was determined by the analysis unit by an analysis of the data. However, the analysis unit or the at least one analysis unit may also be integrated in the reception site, so that provisions may be made for transmitting the data generated by the functional device and the camera to the reception site and to have them analyzed by the analysis unit only there.

Provisions may be made in an especially preferred manner for a (first) analysis unit to be integrated in the functional unit and for a (second) analysis unit to be integrated in the reception site. Provisions can now be made, in particular, for a fault indication being issued by the first analysis unit based on an analysis of the received radiation and being transmitted to the reception site. At the same time, the output of the fault indication may be used as a trigger for a beginning transmission of the (image) data generated by the camera to the reception site. The image data can then be transmitted from the second analysis unit to an output device (e.g., monitor) or analyzed and also be linked in the process, in particular, with the fault indication issued by the first analysis device. Accordingly, provisions may be made for image data to be transmitted to the reception site only when a fault indication is issued by the first analysis unit based on an analysis of the data that depend on the received radiation. However, it is also possible that the image data are transmitted to the reception site (and are, for example, displayed there on a monitor and/or are stored there) independently from such a fault indication, especially upon polling or permanently, but an analysis of these image data transmitted upon polling or permanently by the second analysis unit takes place only upon the issuing of a fault indication by the first analysis unit.

Provisions may preferably be made for the camera to be sensitive in the visible and/or infrared range and especially in the near infrared range of the light spectrum and thus to record corresponding images. This makes possible, in particular, a visual analysis of the image data. Sensitivity in the infrared range of the light spectrum makes it, moreover, possible not to illuminate the monitoring area with visible light by means of infrared light sources.

Furthermore, provisions may preferably be made for the camera to be configured as a thermal imaging camera or for such a thermal imaging camera to be additionally present, i.e., next to one or more cameras sensitive in the visible and/or near infrared range. Such a thermal imaging camera, which is sensitive to the middle to far infrared range, is advantageously suitable for detecting position sources of ignition by the surface temperatures of objects to be determined in the monitoring area by means of data determined by this camera and by a monitoring being performed by an analysis unit (by analysis units) with respect to whether or not possible temperature limits are exceeded.

Unlike in gas detection devices of this class, in which the determination of a gas concentration exceeding a limit value alone is not, as a rule, sufficient for initiating follow-up measures, an analysis of the fault indication can be improved by the integration according to the present invention of a camera in the gas detection device and this linking thus made possible between a fault indication generated by this with the images recorded by the camera to the extent that a direct initiation of a follow-up measure can be derived from this. The linking of the fault indication with the images may be carried out manually (i.e., by a person) by a person relating the contents of the fault indication and the visual contents of the images recorded by the camera. However, an automatic linking is also possible by the analysis unit or one of the analysis units, for which means for the automatic analysis of the images should be present. Provisions may be made with both possibilities for linking the fault indication with the images for an initiation of one or more follow-up measures, which is based on this, to take place manually or automatically (especially by an analysis unit integrated in the reception site).

As a follow-up measure, a decision may be made, for example, on shutting off a plant, especially the plant for the monitoring of which the gas detection device is used, or on the shutting off of a gas line, which carries a gas present at an unacceptably high concentration in the monitoring area. Furthermore, a source of a detected gas can be determined. In addition, a decision can be made on whether to temporarily interrupt the reception of the radiation (so that it is not necessary to initiate further follow-up measures). A potential ignition source may also be determined for a gas to be detected.

The integration according to the present invention of a camera in the gas detection device may preferably also be used to detect a maladjustment of the functional device. The analysis unit may be configured for this to compare an image recorded by the camera with a reference image (recorded with the functional device aligned correctly) in order to infer the direction and extent of the maladjustment from a deviation or displacement of the images being compared to one another.

To make it possible to detect such a maladjustment of the functional device, the camera should preferably be arranged at or in a housing of the functional device, so that it will correspondingly be moved along during an aligning motion of the functional device.

A detected maladjustment of the functional device may cause a readjustment of the functional device to take place as a follow-up measure. This may take place automatically if the gas detection device has a corresponding adjusting device with aligning actuators. The aligning actuators may be configured, for example, in the form of electrical stepping motors, servomotors, motor/gear combinations and/or piezo motors. Pneumatic or hydraulic aligning actuators may be used as well. The aligning actuators (and/or the analysis unit) may be supplied with power via a power supply unit provided for the functional device (especially the radiation source and/or the radiation detector) and/or a separate power supply unit. A separate power supply unit may be embodied by means of a supply line to be connected temporarily for connection to an electric supply network and/or by means of batteries.

In addition to a camera integrated in or at the housing of the functional device, provisions may also be made for the camera to be provided separately, i.e., separated from the functional device structurally and in space or to be connected to a platform, which also fixes the functional device. The connection between the functional device and the platform may preferably be configured as a pivotable connection, especially as a connection pivotable about at least two pivot axes, in order to make it possible to accurately align the functional device with the monitoring area. An especially accurate alignment of the functional device can be achieved if the pivot axes are aligned at right angles to one another. In particular, these can be aligned vertically and horizontally in the position of the platform, which position is intended for the operation of the gas detection device.

The "platform" is a structure (preferably configured such that it is immobile in relation to the intended monitoring area), on which the functional device is or can be permanently or detachably fixed. For example, it may be a wall or an earth-fixed ground structure (e.g., a ground surface or a post anchored in the ground) or a base plate that can be fastened to a wall or to an earth-fixed ground structure. A platform in the form of the stand device, e.g., in the form of a tripod, is also possible.

Provisions may be made in an especially preferred embodiment of the gas detection device according to the present invention for the camera to be arranged within a housing of the functional device, which is especially encapsulated in a pressure-tight (pressure-proof also known as explosion-proof and also flameproof) manner according to EN 60079-1. Such housings are configured such that they withstand the pressure of an explosion (of an unintentionally escaping gas to be detected) which takes place in the interior of the housing and essentially prevent hot combustion gases from being discharged. As a result, the gas detection device can be prevented to the extent possible from acting itself as an ignition source for the escaping gas or from transmitting the ignition of this gas within the housing to the surrounding area.

The integration of both the functional device and the camera in a common housing can make possible a cost-effective configuration of the gas detection device according to the present invention, because the need to provide more than one housing encapsulated in a pressure-tight manner is thus avoided, because such housings are comparatively expensive and may account for a large part of the total cost of a gas detection device.

If the camera is integrated in a housing of the functional device, provisions may preferably be made for the housing to have a passage window on a side facing the monitoring area, said passage window being configured in a first area that is intended for the passage of the radiation as a lens and hence curved on at least one side, while a second area located in the field of view of the camera is configured as a plane-parallel window. Due to the lens-like configuration of the first area, the radiation entering the housing of the functional device can be bundled in order to thus be projected essentially completely onto a radiation detector of the functional device. If the functional device or a functional device (also) comprises a radiation source and thus acts as a transmitter, the lens-like configuration of the first area may be used to make parallel the radiation exiting from the housing of the functional device, so that this can be directed as completely as possible onto a functional device acting as a receiver, which is arranged at a distance from this functional device, or onto a reflector of the gas detection device.

The gas detection device is preferably configured such that it has an additional functional device configured for emitting the radiation, both functional devices being preferably fixed on a platform and being provided at a defined distance (e.g., between about 4 m and about 200 m) for being positioned aligned with one another. However, it is also possible that the functional device is configured for emitting and for receiving the radiation, i.e., as a transmitter/receiver unit and that, in addition, a reflector, which can be positioned independently from this transmitter/receiver unit, is present.

The present invention will be explained in more detail below on the basis of exemplary embodiments shown in the drawings.

The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
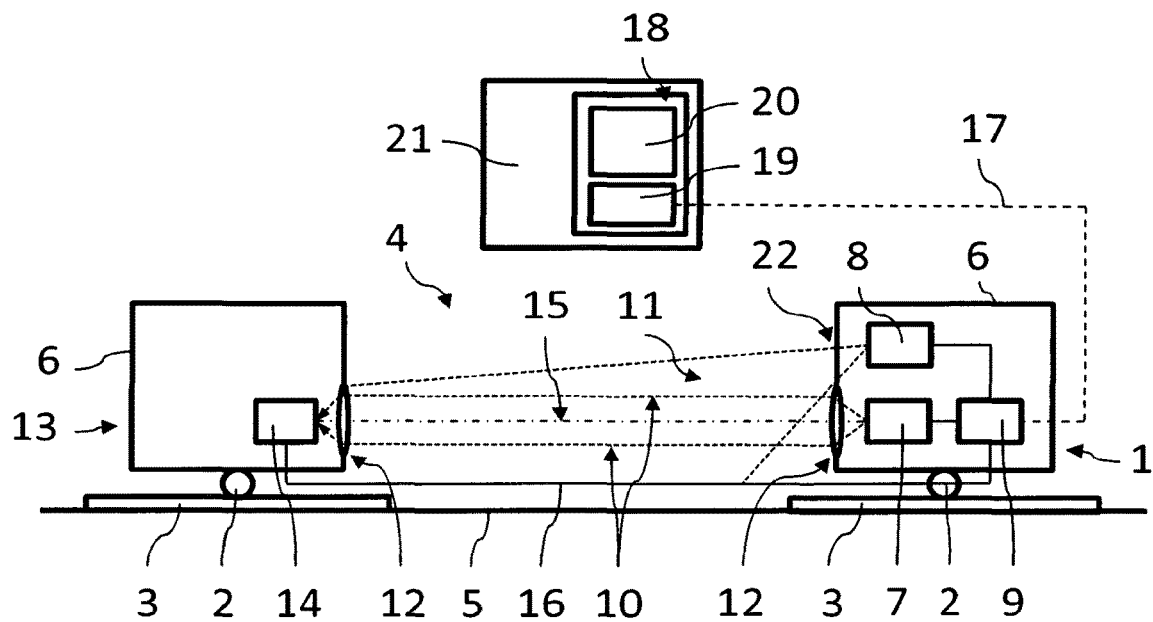
FIG. 1 is a schematic view showing a first embodiment of a gas detection device according to the present invention.

Referring to the drawings, the gas detection device schematically shown in FIG. 1 comprises a first functional device 1, which is connected to a base plate 3 via a swivel joint 2. The base plate 3 is placed on a ground surface 5 at one end of a defined monitoring area 4.

A radiation source 7, a camera 8 as well as a first analysis unit 9, which is connected to the radiation source 7 and the camera 8 in a signal-conducting manner, are integrated in a housing 6 of the first functional device 1, which said housing is encapsulated in a pressure-tight manner according to EN 60079-1.

The side of the housing 6 facing the monitoring area 4 is formed by an optically transparent passage window, through which radiation 10 generated by the radiation source 7 can exit from the housing 6. Furthermore, ambient light can enter the housing 6 via the passage window, so that an image of the monitoring area 4 can be made by the camera 8. The field of view 11 of the camera 8 is configured and aligned here such that it covers a large part of the monitoring area 4.

The radiation 10 emitted by the radiation source 7, which may be, for example, thermal or light radiation, is made parallel by a first area 12 of the passage window, which said area is configured as a curved area on both sides and is thus a lens and is sent, thus directed, in the direction of a second functional device 13 arranged at an opposite end of the monitoring area 4. A second area 22 of the passage window, which is covered by the field of view 11 of the camera 8, is configured as a plane-parallel area, in order to distort the images to be recorded by the camera 8 as little as possible.

A radiation detector 14 is arranged within a housing 6 of the second functional device 13, which housing is likewise encapsulated in a pressure-tight manner according to EN 60079-1. The radiation 10 enters via a passage window facing the monitoring area 4 into the housing 6 of the second functional device 13 and is focused in the process by a (first) area 12 of the passage window, which area is configured as a lens and is curved on both sides. To make it possible to receive the radiation 10 emitted by the radiation source 7 as completely as possible by means of the radiation detector 14, the two functional devices 1, 13 are aligned in relation to one another such that the optical axes 15 of the radiation source 7 and of the radiation detector 14 extend as coaxially as possible.

The received signals generated by the radiation detector 14 as a function of the received radiation 10 are sent via a signal transmission path 16, which may be a wired or wireless path, to the analysis unit 9 integrated in the first functional device 1 and analyzed there. This analysis is based on the detection of changed properties (e.g., radiation output, spectral components, etc.) of the received radiation 10, the changes being based on interactions of the radiation 10 with gases to be detected, which possibly occur in the monitoring area.

If the presence of at least one gas to be detected at an unacceptably high concentration is detected by the first analysis unit 9 based on the analysis of the received radiation 10, a fault indication is transmitted to a reception site 18 via a data transmission path 17, which may preferably be a wireless path but may also be a wired path. The reception site 18 comprises a second analysis unit 19 as well as an output device, for example, a monitor 20, and may be arranged, for example, in a manned monitoring center 21. The fault indication may also contain, in addition to general fault information, concrete information concerning the fact that a detection was made, for example, concerning the species of the detected gas as well as on the integral concentration thereof.

Simultaneously with the generation of the fault indication by the first analysis unit 9, the latter may also activate the camera 8, in which case the image data generated by the camera 8 are transmitted via the first analysis unit 9 and the data transmission path 17 to the second analysis unit 19. The image data may then be displayed as individual images or image sequences (film) on the monitor 20. This makes it possible, for example, for persons manning the monitoring center 21 to infer the source of the gas present in the monitoring area 4 at an unacceptably high concentration by a visual analysis of the images and to initiate corresponding follow-up measures, for example, a shut-off of a plant being monitored by means of the gas detection device or a shut-off of a gas line that carries the gas detected at an unacceptably high concentration. It is, however, also possible that an automatic analysis of the image data, for example, with respect to the source of the gas present at an unacceptably high concentration, is carried out by means of the second analysis unit 19, as a result of which corresponding follow-up measures can be suggested by the second analysis unit 19 to the persons manning the monitoring center 21 or automatically initiated.

In addition to the identification of a source of a gas present at an unacceptably high concentration, the integration according to the present invention of a camera 8 in a radiation-analyzing gas detection device may also make it possible, for example, to infer the cause of an interruption in case of an interruption in the reception of the radiation by the radiation detector 14. In particular, it can now be detected by a visual analysis of the images generated by the camera 8 whether the monitoring area 4 is crossed and thus blocked only briefly, for example, by a vehicle or a person, or whether another fault, which makes a follow-up measure necessary, is present. A possible contamination of the optical system of the gas detection device can also be detected by a linked analysis of the data generated by the radiation detector 14 and by the first analysis unit 9 as well as the camera 8. If the camera 8 is configured as a thermal imaging camera or such a thermal imaging camera is present in addition to a camera 8 that is sensitive in the visible and/or near infrared range, possible ignition sources for flammable gases, such as open flames or hot objects, can advantageously also be detected, especially automatically.

The possibility of analyzing the fault indication is thus considerably improved by the linking of the image data generated by the camera 8 with an unacceptably high concentration of a gas to be detected.

Instead of the configuration shown in FIG. 1, in which the radiation source 7 is integrated with the camera 8 and with the first analysis unit 9 in the first functional device 1, any other desired configuration is possible. In particular, the camera 8 and/or the first analysis unit 9 may also be integrated in the second functional device 13 accommodating the radiation detector 14.

Figure 2:
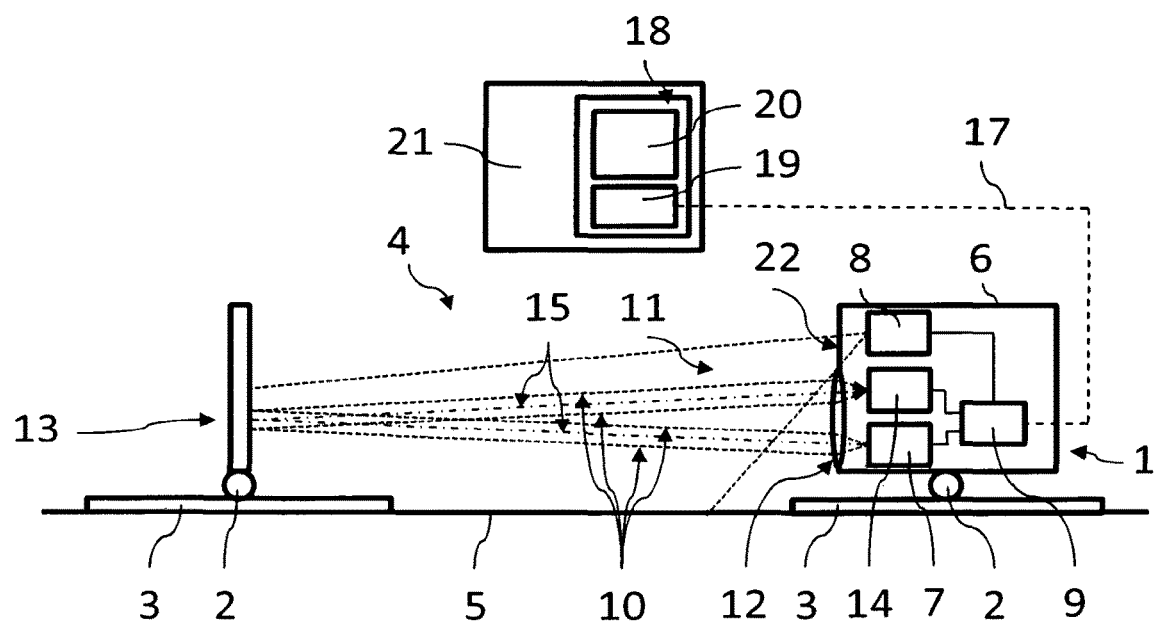
FIG. 2 is a schematic view showing a second embodiment of a gas detection device according to the present invention.

The second embodiment of a gas detection device according to the present invention shown in FIG. 2 differs from the gas detection device shown in FIG. 1 essentially in respect to the functional devices 1 used.

A first functional device 1, which is configured as a transmitter/receiver unit and integrates in the housing 6 the radiation source 7, the radiation detector 14, the camera 8 and the first analysis unit 9, is used here. The second functional device 13 at the correspondingly opposite end of the monitoring area 4 is configured, by contrast, as a reflector, which reflects the radiation 10 emitted by the radiation source 7 into the radiation detector 14. The configuration and the mode of operation of this gas detection device may also correspond to those of the gas detection device according to FIG. 1.

While specific embodiments of the invention have been shown and described in detail to illustrate the application of the principles of the invention, it will be understood that the invention may be embodied otherwise without departing from such principles.

What is claimed is:

1. A gas detection device comprising:
   at least one functional device configured to receive radiation having passed through a defined monitoring area, the functional device including a light emitter and a light detector arranged on different sides of the monitoring area;
   at least one analysis unit configured to detect and analyze a change in the received radiation, which is based on a gas present within the monitoring area;
   at least one thermal imaging camera with a camera field of view that at least partially detects images of the monitoring area;
   a data transmission device connecting the functional device to a reception site;

the analysis unit being configured such that based on an automatic analysis of a received radiation or based on an analysis of an image recorded by the camera or based on an analysis of an image recorded by the thermal imaging camera, or based on any combination of an automatic analysis of a received radiation, an analysis of an image recorded by the camera and an analysis of an image recorded by the thermal imaging camera, the analysis unit transmits data to the reception site by means of the data transmission device;

the data comprise image data of an image recorded by the camera or recorded by the thermal imaging camera or a fault indication or any combination of image data of an image recorded by the camera, recorded by the thermal imaging camera and a fault indication.

2. The gas detection device in accordance with claim 1, further comprising a reflector positioned at a spaced location from the functional device.

3. The gas detection device in accordance with claim 1, wherein the camera is sensitive in both a visible range of the light spectrum and in an infrared range of the light spectrum.

4. The gas detection device in accordance with claim 1, wherein the camera is arranged at or in a housing of the functional device or is fastened to a platform pivotably connected to the functional device.

5. The gas detection device in accordance with claim 1, wherein the camera is arranged within a housing of the functional device, which housing is encapsulated to be pressure-tight.

6. The gas detection device in accordance with claim 5, wherein the housing has a passage window on a side facing the monitoring area, wherein the passage window is configured as a lens in a first area, which is provided for passage of the radiation and is configured as a plane-parallel window in a second area located in the field of view of the camera.

7. The gas detection device in accordance with claim 1, wherein the analysis unit is configured to compare an image recorded by the camera with a reference image in order to determine a maladjustment of the functional device.

8. A method of gas detection, the method comprising the steps of:
providing a gas detection device comprising: at least one functional device configured to receive radiation having passed through a defined monitoring area, the functional device including a light emitter and a light detector arranged on different sides of the monitoring area; at least one analysis unit configured to detect and analyze a change in the received radiation, which is based on a gas present within the monitoring area; and at least one thermal imaging camera with a camera field of view that at least partially detects the monitoring area, wherein a fault indication based on the analyzed change in the received radiation is linked with the image data of an image recorded by the camera, and wherein
a decision is made on shutting off an industrial plant;
a source of a detected gas is determined;
a decision is made on whether an interruption of the reception of the radiation is temporary;
a potential ignition source for a gas to be detected is determined as a follow-up measure on the basis of this linking; or
any combination of a decision is made on shutting off an industrial plant; a source of a detected gas is determined; a decision is made on whether an interruption of the reception of the radiation is temporary; and a potential ignition source for a gas to be detected is determined as a follow-up measure on the basis of this linking.

9. The method in accordance with claim 8, wherein the follow-up measure or the plurality of follow-up measures is/are initiated automatically.

10. The gas detection device in accordance with claim 1, wherein:
the camera detects images of objects in the monitoring area.

11. The gas detection device in accordance with claim 1, wherein:
the camera is configured to record the images of the monitoring area as a function of the gas concentration determined by the analysis unit.

12. A gas detection device for detecting a gas in a defined monitoring area, the monitoring area including structure for processing the gas, the device comprising:
a radiation source transmitting radiation through the monitoring area;
a receiver with a radiation detector configured to receive radiation from said radiation source after passing through the monitoring area, said receiver generating radiation data as a function of the radiation received;
an analysis unit configured to receive the radiation data from the receiver, said analysis unit being configured to analyze the received radiation from the radiation data to determine a concentration of the gas unintentionally discharged within the monitoring area; and
a camera configured to record an image of the monitoring area, said camera being activated as a function of the gas concentration determined by said analysis unit.

13. The gas detection device in accordance with claim 12, wherein:
said camera is configured to have the recorded image include objects in the monitoring area.

14. The gas detection device in accordance with claim 12, wherein:
said camera is configured to have the image include information on a source of gas in the monitoring area.

15. The gas detection device in accordance with claim 12, wherein:
said analysis unit also determines from the radiation data if a fault indication exits in the monitoring area;
said camera is configured to have the image include objects causing the fault indication.

16. The gas detection device in accordance with claim 12, wherein:
said analysis unit also determines from the radiation data if a fault indication exits in the monitoring area;
said camera is configured to provide an image of the monitoring area if a fault indication exits in the monitoring area.

17. The gas detection device in accordance with claim 13, wherein:
said analysis unit also determines from the radiation data if a fault indication exits in the monitoring area;
said camera is configured to provide an image of the monitoring area if a fault indication exits in the monitoring area.

18. A gas detection device for detecting gas in a defined monitoring area, the device comprising:
a radiation source transmitting radiation through the monitoring area;
a receiver with a radiation detector configured to receive radiation from said radiation source after passing through the monitoring area, said receiver generating radiation data as a function of the radiation received;

an analysis unit configured to receive the radiation data from the receiver, said analysis unit being configured to analyze the received radiation from the radiation data to determine a gas concentration within the monitoring area, said analysis unit also determining from the radiation data if a fault indication exits in the monitoring area; and a camera configured to record an image of the monitoring area, said camera being activated as a function of the gas concentration determined by said analysis unit, said camera being configured to provide an image of the monitoring area if a fault indication exits in the monitoring area.

* * * * *